US008638871B2

(12) United States Patent
Krauss et al.

(10) Patent No.: US 8,638,871 B2
(45) Date of Patent: Jan. 28, 2014

(54) SYSTEM AND METHOD FOR COMBINATION MULTIPLE INPUT, MULTIPLE OUTPUT (MIMO) AND BEAMFORMING

(75) Inventors: Thomas P. Krauss, Algonquin, IL (US); Frederick W. Vook, Schaumburg, IL (US); Xiangyang Zhuang, Lake Zurich, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1126 days.

(21) Appl. No.: 12/340,857

(22) Filed: Dec. 22, 2008

(65) Prior Publication Data

US 2010/0158151 A1 Jun. 24, 2010

(51) Int. Cl.
*H04B 7/02* (2006.01)

(52) U.S. Cl.
USPC ........... 375/267; 370/260; 370/295; 370/299; 370/316; 370/340; 370/334; 455/69; 455/562.1

(58) Field of Classification Search
CPC .... H04B 7/043; H04B 7/0434; H04B 7/0617; H04B 7/0689; H04B 7/0691; H04L 25/0224; H04L 25/03343; H04L 25/0248; H04W 72/0413; H04W 16/28
USPC ................. 375/260, 267, 295, 299, 316, 340; 455/69, 562.1; 370/334
See application file for complete search history.

(56) References Cited

U.S. PATENT DOCUMENTS

| | | | |
|---|---|---|---|
| 6,785,520 B2 * | 8/2004 | Sugar et al. | 455/101 |
| 6,927,728 B2 * | 8/2005 | Vook et al. | 342/377 |
| 7,200,368 B1 | 4/2007 | Hottinen et al. | |
| 7,308,287 B2 * | 12/2007 | Vaidyanathan | 455/562.1 |
| 7,872,963 B2 * | 1/2011 | Choi et al. | 370/208 |
| 8,401,106 B2 * | 3/2013 | Kangas et al. | 375/267 |
| 2005/0041750 A1 | 2/2005 | Lau | |
| 2006/0035643 A1 * | 2/2006 | Vook et al. | 455/450 |
| 2006/0093065 A1 * | 5/2006 | Thomas et al. | 375/299 |
| 2007/0049347 A1 | 3/2007 | Jin et al. | |
| 2007/0086543 A1 | 4/2007 | David et al. | |
| 2007/0274197 A1 * | 11/2007 | Thomas et al. | 370/201 |
| 2008/0188186 A1 | 8/2008 | Hwang et al. | |
| 2009/0042618 A1 * | 2/2009 | Hedayat et al. | 455/562.1 |
| 2009/0080504 A1 * | 3/2009 | Li et al. | 375/220 |
| 2009/0116569 A1 * | 5/2009 | Jin | 375/260 |
| 2009/0270118 A1 * | 10/2009 | Jin et al. | 455/517 |

FOREIGN PATENT DOCUMENTS

KR 1020020037635 A 5/2002

OTHER PUBLICATIONS

Sampath, Hemanth et al.: "Joint Transmit and Receive Optimization for High Data Rate Wireless Communication Using Multiple Antennas", 0/7803-5700-0/99/1999 IEEE, pp. 215-219.

(Continued)

*Primary Examiner* — Sophia Vlahos

(57) ABSTRACT

Specifically, a method and system that performs MIMO and beamforming at a base station based on an uplink channel sounding (ULCS) from only one of the mobile station antennas and closed-loop multiple input, multiple output (MIMO) schemes based on the singular value decomposition (SVD) of the channel matrix. The ULCS is limited to sounding and the channel uses fewer than an optimal number of transmit antennas (e.g. one for WiMAX). The base station arrays may be configured for a full array transmitting mode or a sub-array transmitting mode.

8 Claims, 12 Drawing Sheets

(56) References Cited

OTHER PUBLICATIONS

Thomas, Timothy A. et al.: "Obtaining Channel Knowledge for Closed-Loop Multi-Stream Broadband MIMO-OFDM Communications Using Direct Channel Feedback", Paper appears in Globecom 2005, (Nov. 28, 2005-Dec. 2, 2005), pp. 1-5.

Thomas, Timothy A. et al.: "MIMO Strategies for Equal-Rate Data Streams", VTC 2001 Fall, pp. 1-5.

Hillery, William J. et al.: "Finite Impulse Response Cyclic Shift Transmit Diversity for Broadband Mobile OFDM", VTC 2007 Fall, pp. 1-5.

Sehier, Philippe et al.: "Combination of MIMO and Beamforming for WiMAX DL", Alcatel, WiMAX Forum Nov. 10, 2006, pp. 1-11.

Kim, Byeong Gyun: "The International Search Report and the Written Opinion of the International Searching Authority", Korean Intellectual Property Office, Daejeon, Republic of Korea, completed: Jun. 30, 2010, mailed: Jun. 30, 2010, all pages.

\* cited by examiner

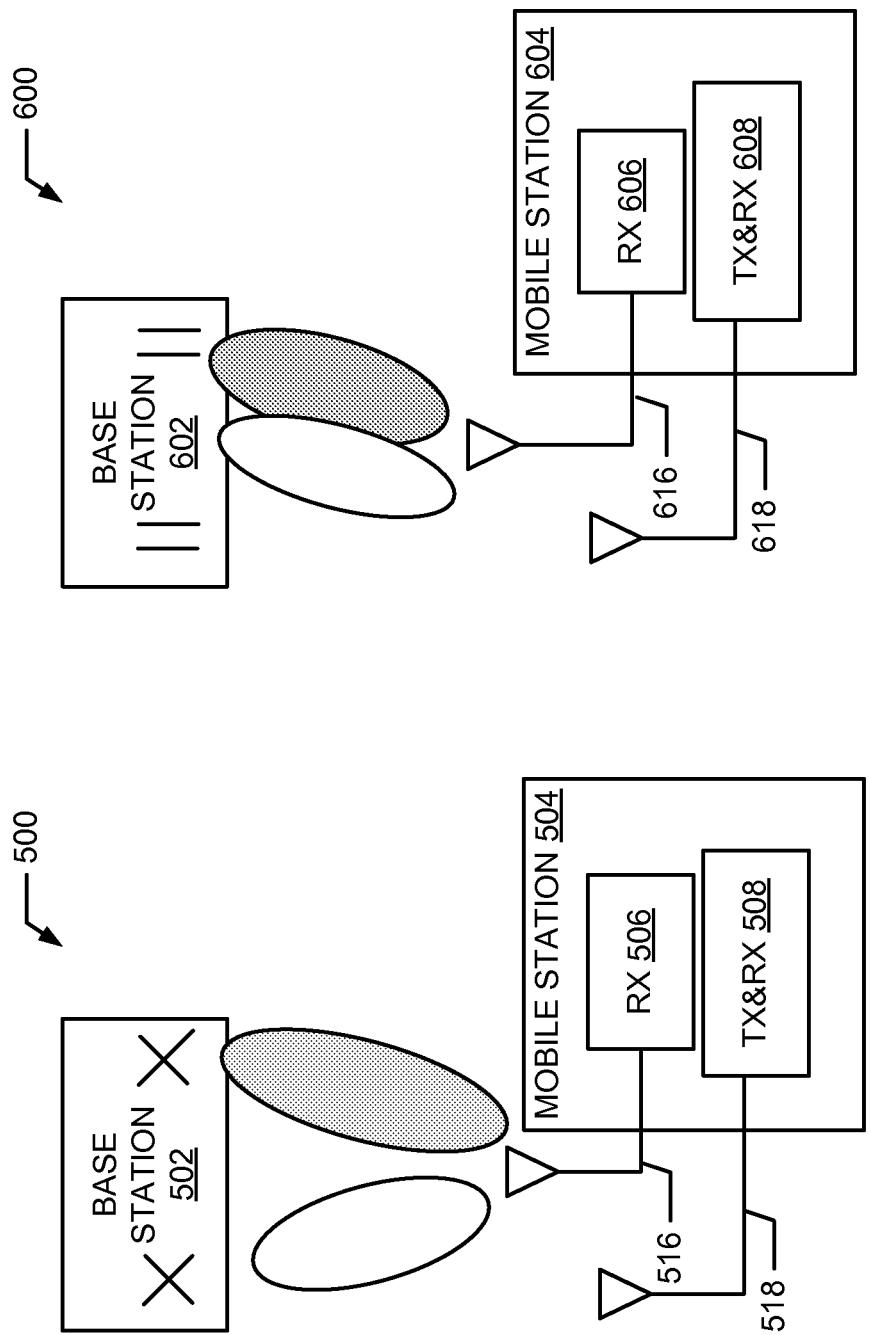

SYSTEM AND METHOD FOR COMBINATION MULTIPLE INPUT, MULTIPLE OUTPUT (MIMO) AND BEAMFORMING

BACKGROUND

1. Technical Field

The present invention generally relates to wireless communication systems and in particular to a combination of multiple input, multiple output and beamforming (MIMO+BF) using a single antenna sounding from a mobile station (MS).

2. Description of the Related Art

In a Worldwide Interoperability for Microwave Access (WiMAX) mobile system, an option exists to provide for the transmission in a two-antenna Space Time Coding (STC) zone using dedicated pilots (hereinafter referred to as a "STC option"). The STC option allows for the use of beamforming in conjunction with a multiple input, multiple output (MIMO) downlink (DL) transmission to provide both coverage and capacity benefits over the use of either technique separately. In the STC operating mode, the base station (BS) would form two beams that essentially create "virtual" antennas over which MIMO Matrix A or MIMO Matrix B transmission can be performed. Unfortunately, to support such a transmission technique, the WiMAX profile supports uplink channel sounding (ULCS) from only one of the subscriber antennas, thereby precluding the conventional closed-loop MIMO schemes (e.g. MIMO schemes based on the singular value decomposition (SVD) of the channel matrix).

The WiMAX profile and others describe a broad idea of MIMO+BF in a closed-loop (CL) MIMO system with a single antenna sounding. Some suggest that CL-MIMO does not work with knowledge to only one receive antenna. In one example, the WiMAX R1W2 profile allows for the combination of MIMO and beamforming by permitting MIMO Matrix A/B transmission with dedicated pilots. In another example, the WiMAX R1W2 profile contains an up link channel sounding (ULCS) from only one mobile station (MS) antenna. The base station (BS) learns the channel to only one of the MS's RX antennas. However, it would be desirable to provide closed-loop Spatial Multiplex MIMO transmission with knowledge of a M-by-1 (where M represents the number of BS antennas, M>1) downlink (DL) channel and that computes the transmit weights for such closed-loop MIMO transmissions.

BRIEF DESCRIPTION OF THE DRAWINGS

The invention itself will best be understood by reference to the following detailed description of an illustrative embodiment when read in conjunction with the accompanying drawings, wherein:

FIG. 5 is a WiMAX OFMDA system having a cross-polarized antenna array for implementing one or more embodiments of the invention;

FIG. 6 is a WiMAX OFMDA system having a linear antenna array for implementing one or more embodiments of the invention;

Figure 1:
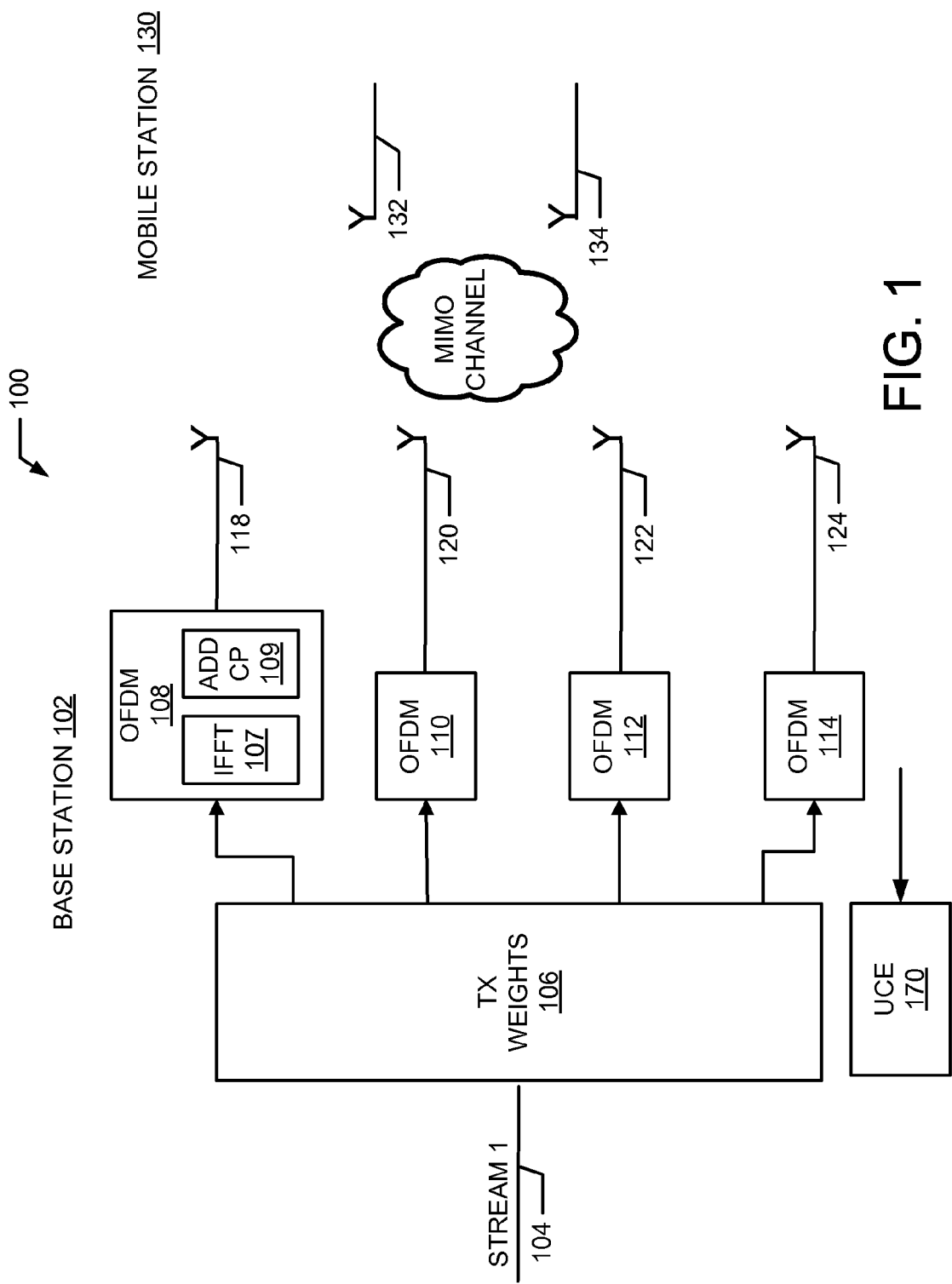
FIG. 1 is a Worldwide Interoperability for Microwave Access (WiMAX) orthogonal frequency division multiplex access (OFMDA) system with a one stream transmission from the base station for implementing one or more embodiments of the invention.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention. It should be understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

DETAILED DESCRIPTION OF ILLUSTRATIVE EMBODIMENTS

The illustrative embodiments provide a method and system that performs MIMO and beamforming at a base station based on an uplink channel sounding (ULCS) from only one of a mobile station's antennas, and closed-loop MIMO schemes based on the singular value decomposition (SVD) of the channel matrix.

In the following detailed description of exemplary embodiments of the invention, specific exemplary embodiments in which the invention may be practiced are described in sufficient detail to enable those skilled in the art to practice the invention, and it should be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

FIG. 1 is a Worldwide Interoperability for Microwave Access (WiMAX) orthogonal frequency division multiplex access (OFMDA) system 100 with a one stream transmission in accordance with one embodiment. As will be seen from the description provided below, the BS 102 in WiMAX system 100 may learn the channel to only one of the MS antennas 132 or 134 of the mobile station 130 using closed-loop MIMO methodologies for forming the beams that create the "virtual" transmit antennas so as to provide additional coherent processing gain to the Matrix A/Matrix B transmission methods and increase the percentage of the cell in which to provide capacity and coverage gains. Furthermore, the BS 102 in the WiMAX system 100 is operable to perform MIMO+BF to form two or more array beams that act as "virtual" antennas over which Matrix A/B transmission can be performed (where A/B means A or B). The WiMAX system 100 is further operable to combine the Multiple-input, Multiple-output (MIMO) modes of WiMAX (i.e., Matrix-A/Space-time Coding (STC) and Matrix-B/Spatial Multiplexing (SM)) with a ULCS-based closed-loop (CL) transmission.

In one configuration, the ULCS waveform from the one MS transmit antenna 132 may have a certain decimation factor from the first (and only the first) MS antenna 132. The BS 102 in the system 100 also supports single-stream transmission 104 using a single-stream closed-loop technique (e.g. Max-ratio Transmission (MRT), Statistical Eigen-beam-forming (EBF), and EBF applied over Clusters) and open-loop STC and SM technique without beamforming. The BS 102 includes an Uplink Channel Estimator (UCE) 170, as will be described in more detail later.

In one configuration, the single-stream closed-loop techniques are combined with a two-stream STC or SM transmission by assigning the two pairs of beamformed transmit-antennas to the two streams. In another configuration, the closed-loop techniques are extended to use the full transmit antenna array for both streams, by employing, for example, weights that are based on the first and second largest singular vector of the spatial covariance matrix.

Returning again to FIG. 1, the BS 102 of system 100 includes a plurality of OFDM blocks 108, 110, 112 and 114 having an output coupled to transmit antenna 118, 120, 122, and 124, respectively. Each OFDM block 108, 110, 112 and 114 takes the Inverse Fast Fourier Transform (IFFT) at block 107 and appends or adds a cyclic prefix (CP) at block 109. Each of the single-stream closed-loop techniques (i.e. MRT, EBF, Cluster EBF, single antenna, etc.) is defined by a stream having applied thereto to transmit weighting at TX weights block 106, as shown in FIG. 1, where a frequency dependent multiplication of the stream signal (pilot or data) on line 104 by a transmit weight for each antenna 118, 120, 122, and 124 or antenna path takes place.

Figure 2:
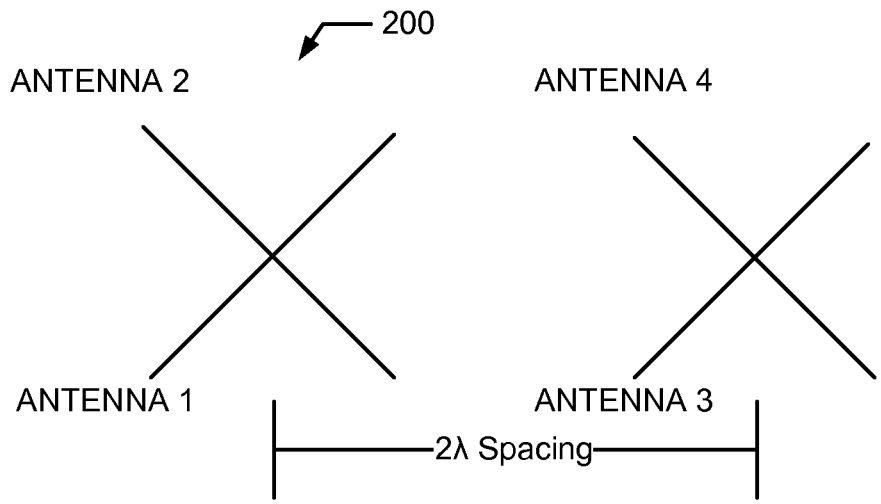
FIG. 2 is a dual antenna access point ("Dual DAP") base station antenna configuration for implementing one or more embodiments of the invention.
Figure 3:
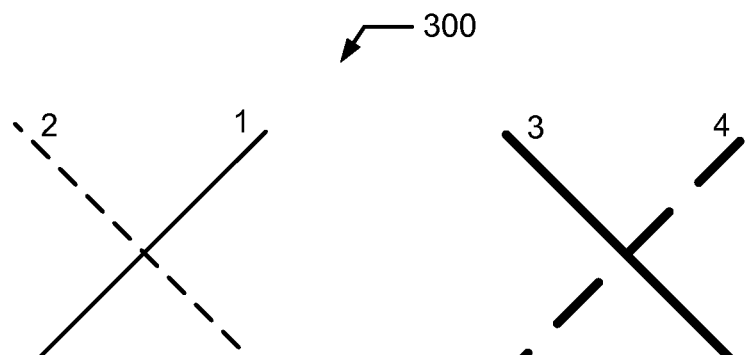
FIG. 3 is a first antenna pairing and ordering within pairs for the "Dual DAP" configuration of FIG. 2.
Figure 4:
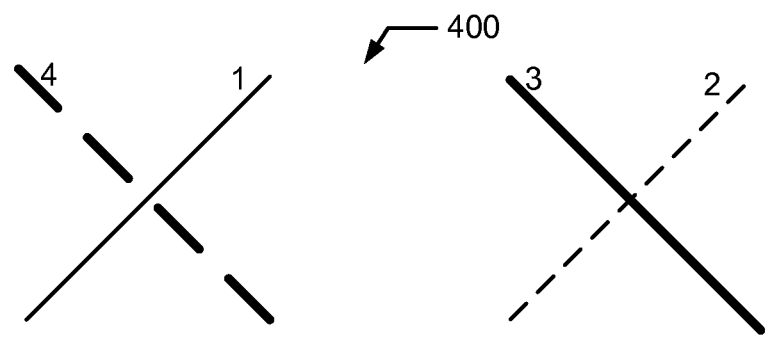
FIG. 4 is a second antenna pairing and ordering within pairs for the "Dual DAP" configuration.

FIG. 5 is a WiMAX OFMDA system 500 having base station 502 with a cross-polarized antenna array in accordance with one embodiment. The antenna array at the BS 502 may be configured in a dual antenna access point ("Dual DAP") having two cross-polarized pairs, as shown in FIGS. 2-4. The "Dual DAP" transmission to the MS 504 with a cross-polarized pair of antennas has a MIMO conditioning that is highly sensitive to the antenna pairing. Thus, depending on the pairing at the cross-polarized pair of antennas, the conditioning can be very good or very poor. The MS 504 includes a receiver 506 coupled to a first antenna 516. The MS 504 also includes a transmitter and receiver (or transceiver) 508 which are coupled to a second antenna 518. MS 504 transmits uplink channel sounding (ULCS) from antenna 518.

Figure 7:
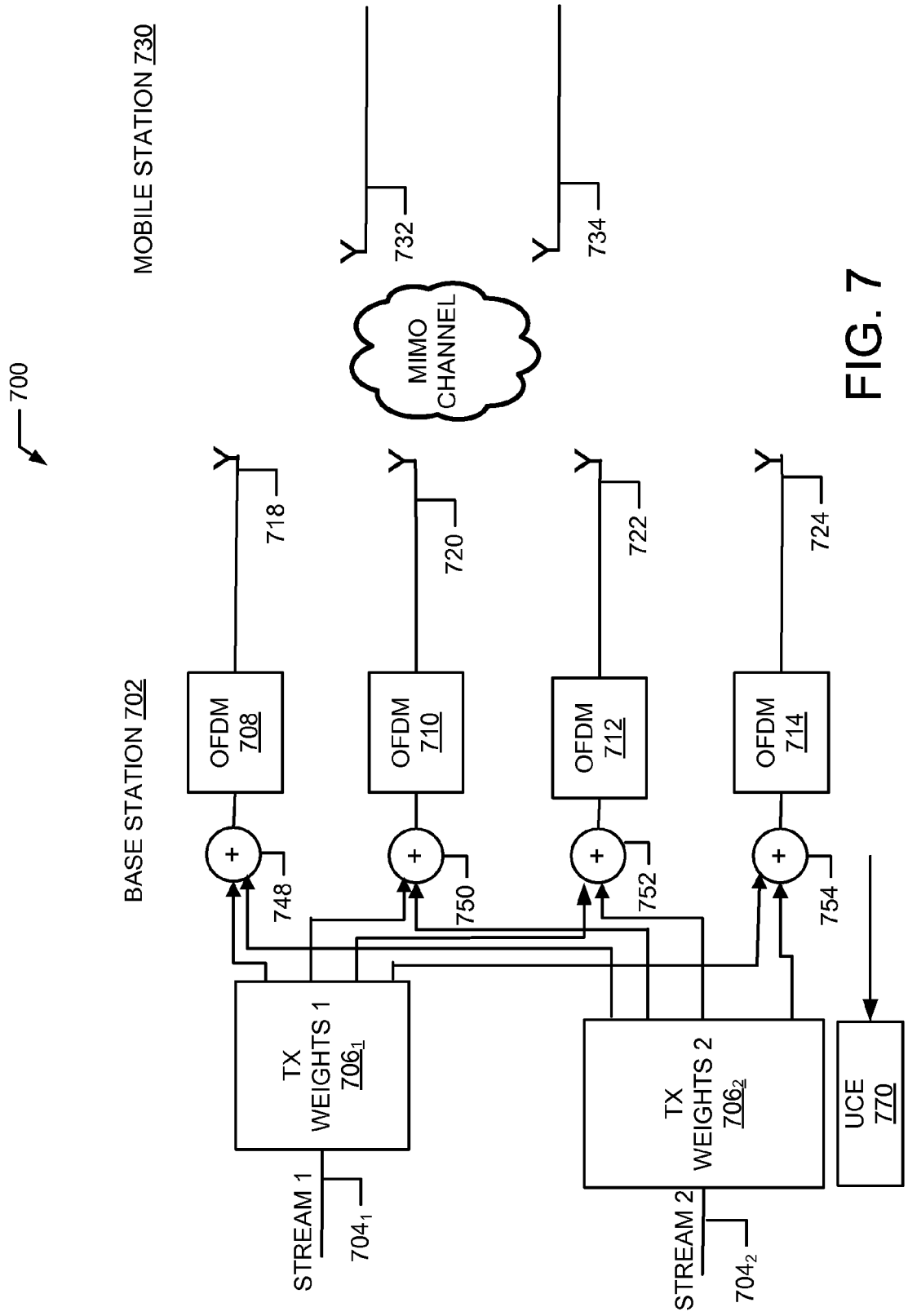
FIG. 7 is a WiMAX OFMDA system incorporating a full array transmit mixing mode with two transmission streams from a base station for implementing one or more embodiments of the invention.

FIG. 2 shows a "Dual DAP" base station antenna configuration 200. The "Dual DAP" base station configuration 200 may be used in system 100 (FIG. 1), 500 (FIG. 5) or 700 (FIG. 7). However, the "Dual DAP" base station configuration 200 will be described in relation to system 100 of FIG. 1. The system 100 communicates a WiMAX OFDM downlink (DL) with partial usage of subchannels (PUSC) permutation and one transmit stream, although the invention can easily be used with other subcarrier allocation methodologies. In FIG. 7, the WiMAX OFDM downlink has a PUSC permutation with two transmit streams. The system 100 may employ a convolutional turbo code (CTC). The mobile station (MS) has two receive antennas 132 and 134. The base station has four antennas 118, 120, 122 and 124 in the "Dual DAP" configuration, as seen in FIG. 2, which comprises two pairs of +/−45 degree slant polarized antennas, spaced two wavelengths ($\lambda$) apart.

The "Dual DAP" antenna array configuration 200 is described in relation to two different examples of antenna orderings and pairings. In configuration 200, each pair is a cross-polarized, collocated pair of antennas, with a spacing of 2 wavelengths ($\lambda$) between the pairs (1, 2) and (4, 3).

The "antenna-order" may be defined as a(i)=(1, 2, 4, 3) or (1, 3, 4, 2) in which the list a(i) provides the physical ANTENNA number for ANTENNA index i. In this notation, the first two entries are the physical antennas for the first pair while the second two entries are antennas for the second pair. The odd entries denote the first antenna of the pair, while the even entries denote the second antenna of the pair.

FIG. 3 is a first antenna pairing and ordering 300 within pairs for the "Dual DAP" configuration of FIG. 2. FIG. 4 is a second antenna pairing and ordering 400 within pairs for the "Dual DAP" configuration. The "Dual DAP" antenna array configuration 200 is used with two different antenna orderings and pairings 300 or 400. The first antenna pairing and ordering 300 is a (1, 2, 4, 3) antenna configuration where the first pair of antennas is denoted by the thinner lines 1, 2 and the second pair of antennas is denoted by the thicker lines 3 and 4. The first antenna pairing and ordering 300 groups the antennas 118, 120, 122 and 124 so that the co-located cross polarized antennas are paired together for beamforming. The second antenna array pairing and ordering 400 is a (1, 3, 4, 2) antenna configuration that groups the antennas 118, 120, 122 and 124 so that the antennas with the same vertical orientation (i.e. polarization slant) are paired together for beamforming. The first pair corresponds to the (1, 2) having the thinner lines and the second pair (3, 4) having the thicker lines. Within the above pairs, the first antenna is solid and the second antenna is dashed. In FIGS. 3 and 4, the numbers labeling of the antennas across the top indicate which antenna index is assigned to the given physical antenna. In FIG. 3, antenna 118 corresponds to physical ANTENNA 1, antenna 120 corresponds to physical ANTENNA 2, antenna 122 corresponds to physical ANTENNA 4, and antenna 124 corresponds to physical ANTENNA 3, while in FIG. 4, antenna 118 corresponds to physical ANTENNA 1, antenna 120 corresponds to physical ANTENNA 3, antenna 122 corresponds to physical ANTENNA 4, and antenna 124 corresponds to physical ANTENNA 2.

FIG. 6 is a WiMAX OFMDA system 600 having base station 602 with a linear antenna array in accordance with one embodiment. The MS 604 includes a receiver 606 coupled to a first antenna 616. The MS 604 also includes a transmitter and receiver (or transceiver) 608 which are coupled to a second antenna 618. The MS 604 transmits ULCS with antenna 618.

Figure 11:
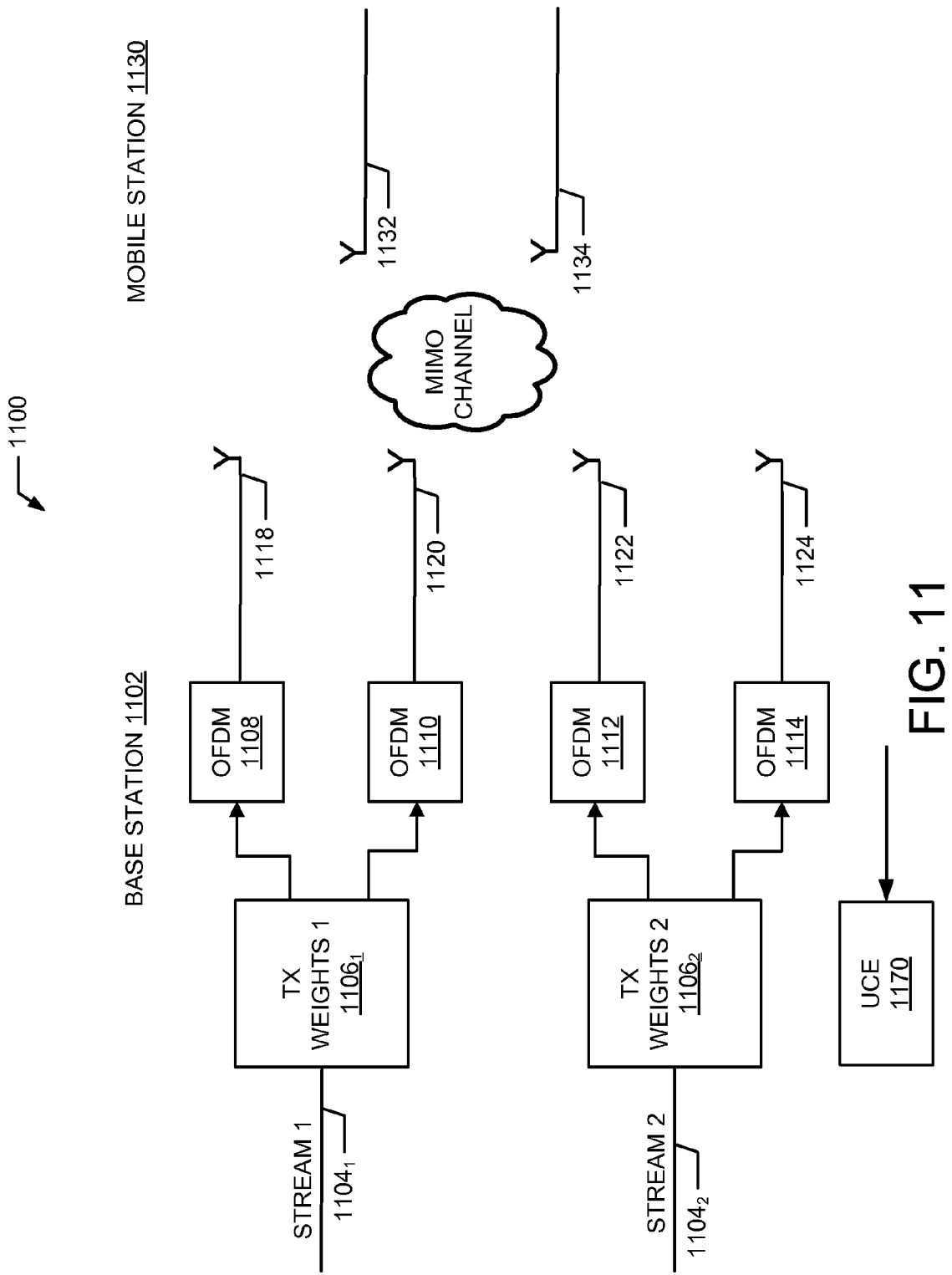
FIG. 11 is a WiMAX OFMDA system incorporating a sub-array transmit mixing mode with two transmission streams from a base station for implementing one or more embodiments of the invention.

In a two stream transmission case, the BS antenna may be operable to perform a sub-array transmit mixing mode, as will be described in relation to FIG. 11 and a full array transmit mixing mode, as will be described in relation to FIG. 7. The "transmit mixing" is the process of mapping the input data streams to the antennas. In the sub-array (or partial array) transmit mixing mode, the two transmit streams are divided amongst pairs of antennas as shown in FIG. 11. In the sub-array transmit mixing mode, the BS antenna may be a linear array, as in FIG. 6, or a cross-polarized antenna array, as in FIG. 5.

FIG. 7 is a WiMAX OFMDA system 700 having a base station 702 with a full array transmit mixing mode in accordance with one embodiment. The BS 702 of the system 700 includes a plurality of OFDM blocks 708, 710, 712 and 714 having an output coupled to a transmit antenna 718, 720, 722, and 724, respectively. Each of the OFDM blocks 708, 710, 712 and 714 takes the Inverse Fast Fourier Transform (IFFT) and appends or adds a cyclic prefix (CP). In the full array transmit mixing mode, the two transmit streams on lines $704_1$ and $704_2$ each employ a weight denoted by TX weight blocks $706_1$ and $706_2$ that is supplied to each antenna 718, 720, 722 and 724, with the signal at each antenna given by the sum, via summers 748, 750, 752 and 754, of the weighted streams from the TX weight block $706_1$ and $706_2$. Summer 748 is coupled to the OFDM block 708 in the path to the transmit antenna 718 and sums the weighted stream from the TX weight block $706_1$ and the TX weight block $706_2$. Summer 750 is coupled to the OFDM block 710 in the path to the transmit antenna 720 and sums the weighted stream from the TX weight block $706_1$ and the TX weight block $706_2$. Summer 752 is coupled to the OFDM block 712 in the path to the transmit antenna 722 and sums the weighted stream from the TX weight block $706_1$ and the TX weight block $706_2$. Summer 754 is coupled to the OFDM block 714 in the path to the transmit antenna 724 and sums the weighted stream from the TX weight block $706_1$ and the TX weight block $706_2$. In the full array transmit mixing mode each beam uses all the transmit antennas 718, 720, 722, and 724 in the array. The BS 702 experiences or encounters a MIMO channel.

The mobile station (MS) 730 includes a first antenna 732 and a second antenna 734. The MS 730 sends a UCLS signal from antenna 732 that is received by the BS 702. The BS 702 includes an Uplink Channel Estimator (UCE) 770, as will be described in more detail later.

Figure 8:
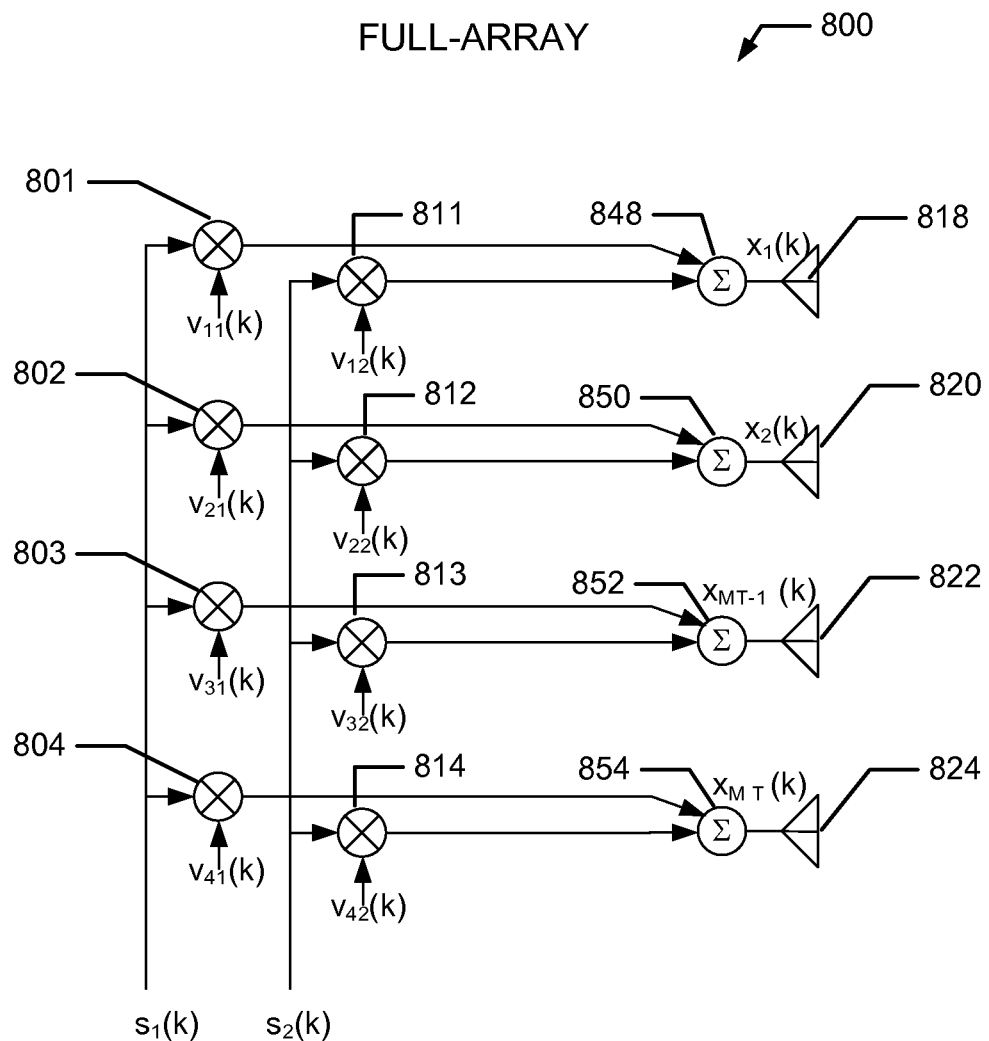
FIG. 8 is a schematic diagram for applying weights to the full array transmit mixing mode of FIG. 7.

FIG. 8 is a schematic diagram 800 for applying weights to the full array transmit mixing mode as in FIG. 7. In the full array transmit mixing mode, the two transmit streams for OFDM subcarrier k denoted as $s_1(k)$ and $s_2(k)$ are each multiplied by a plurality of weights for each of the antenna paths. Thus, transmit stream $s_1(k)$ is multiplied by weights $v_{11}(k)$, $v_{21}(k)$, $v_{31}(k)$ and $v_{41}(k)$ via multipliers 801 in a first antenna path, 802 in a second antenna path, 803 in a third antenna path and 804 in a fourth antenna path, respectively, where k is the subcarrier, and the index i of $v_{ij}(k)$ denotes the receive antenna 1, 2, 3 or 4 and the index j of $v_{ij}(k)$ denotes the stream j=1 or 2. The output of multipliers 801, 802, 803, and 804 are summed in summers 848, 850, 852 and 854, respectively. The transmit stream $s_2(k)$ is multiplied by weights $v_{12}(k)$, $v_{22}(k)$, $v_{32}(k)$ and $v_{42}(k)$ via multipliers 811 in the first antenna path, 812 in the second antenna path, 813 in the third antenna path and 814 in a fourth antenna path, respectively. The output of multipliers 811, 812, 813 and 814 are summed in summers 848, 850, 852 and 854, respectively. The outputs of the summers 848, 850, 852 and 854 produce outputs $x_1(k)$, $x_2(k), \ldots, x_{MT-1}(k)$ and $x_{MT}(k)$ on antennas 818, 820, 822 and 824, respectively, (where $x_1(k)$ and $x_{MT}(k)$ represents the first and last elements of the vector $[x_1(k), x_2(k), \ldots, x_{MT-1}(k), x_{MT}(k)]$).

Figure 9:
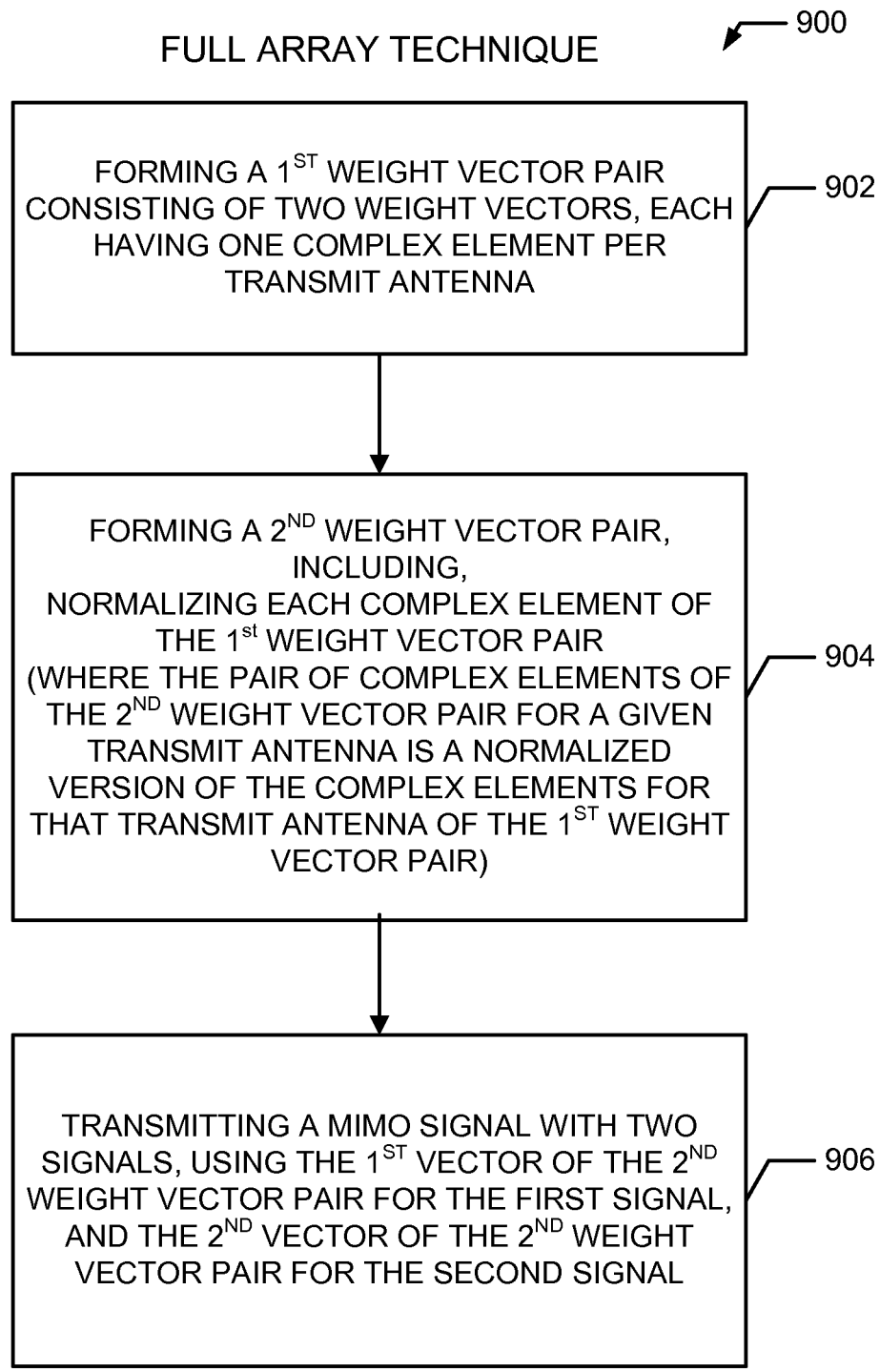
FIG. 9 is a flowchart of a process to combine MIMO and beamforming in the full array transmit mixing mode for implementing one or more embodiments of the invention.

FIG. 9 is a flowchart of a process 900 to combine MIMO and beamforming in the full array transmit mixing mode. The process 900 begins with block 902 where a first weight vector pair is formed. The first weight vector pair includes two weight vectors, each having one complex element per transmit antenna. At block 904, a second weight vector pair is formed which includes normalization. Normalization may include a 2-norm normalization function of the original weights on a given antenna. Another normalization process takes $$\frac{1}{\sqrt{2}}$$

times the unit-modulus of the original weight.

In the second weight vector pair, the complex elements for a given transmit antenna is a normalized version of the complex elements for that transmit antenna of the first weight vector pair. At block 906, the MIMO signal is transmitted by the base station with two signals using the first weight vector of the second weight vector pair for the first signal and the second weight vector of the second weight vector pair for the second signal. The MIMO signal may be transmitted over the second weight vector pair either in a transmit diversity or in a SM mode by the base station.

Figure 10:
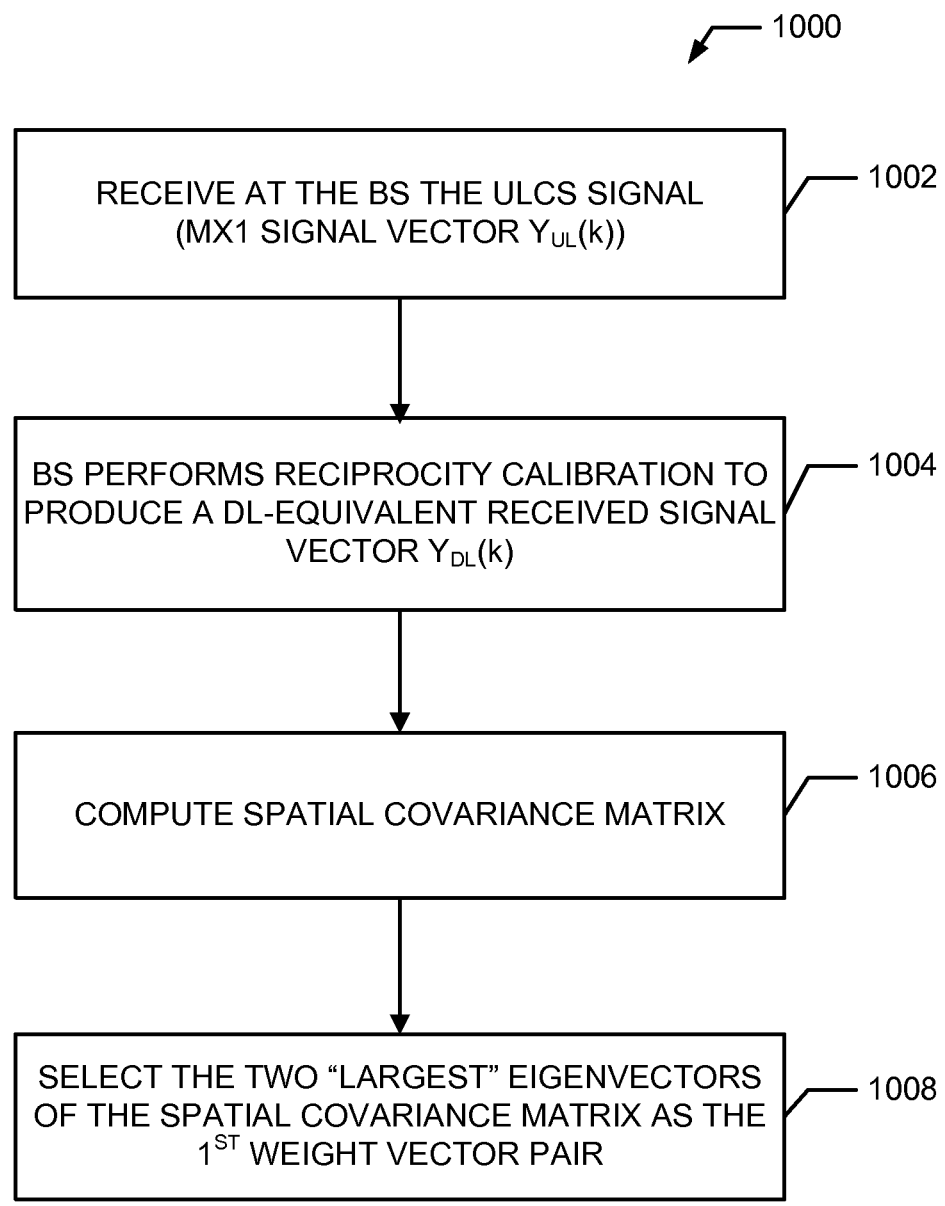
FIG. 10 is a flowchart of a process to compute a first weight vector pair of FIG. 9.

FIG. 10 is a flowchart of a process 1000 to compute a first weight vector pair at block 902 of FIG. 9. The process 1000 begins, at block 1002 where the BS receives a M-by-1 signal (where M represents the number of BS antennas) vector $y_{UL}(k)$ on subcarrier k. At block 1004, the BS performs reciprocity calibration (i.e., accounts for its non-reciprocal transceiver hardware) by multiplying $y_{UL}(k)$ by a calibration coefficient vector (element-by-element) to produce a DL-equivalent received signal vector $y_{DL}(k)$. The first weight vector pair may be computed based on the received signal on the uplink, and the received signal may be an uplink data transmission or an uplink control signal or an uplink sounding symbol. For example, the first weight vector pair may be computed based on the spatial covariance matrix. Accordingly, at block 1006, the spatial covariance matrix R is computed from the DL-equivalent received signal vector according to equation Eq (1)

$$R = \frac{1}{K}\sum_{k=1}^{K} Y_{DL}^H(k)Y_{DL}(k) \qquad \text{Eq (1)}$$

where superscript H is the conjugate transpose operator; and K may vary as a function the frequency response tracking of the single-stream closed-loop technique (e.g. Max-ratio Transmission (MRT), Statistical Eigen-beamforming (EBF), and EBF over Clusters) and may be set for each subcarrier (i.e., K=1), over a set of subcarriers corresponding to a particular subchannel/Cluster of interest (where K equals the total number of subcarriers in the subchannel/Cluster of interest), or over the whole bandwidth (where K equals the total number of usable OFDM subcarriers). In these cases, the values of k are assumed to logical values in that the values of k correspond to the k'th physical subcarrier within a block of physical subcarriers that are used to compute the R in equation Eq (1). The resulting transmit weight vector computed based on the spatial covariance matrix R is generally applied to (and therefore held constant over) the range of frequencies corresponding to the block of K subcarriers.

Thus, the frequency response of the DL channel may be tracked three ways which include for each subcarrier, over a set of subcarriers corresponding to a particular sub-channel/Cluster of interest, or over the whole bandwidth. The term "tracking the frequency response" or its equivalent refers to how often the transmit weights changed across the frequency bandwidth. The level of frequency response tracking is determined by the block size (e.g., number of subcarriers in block of K subcarriers) in equation Eq (1), and each block of K subcarriers may have a different pair of transmit weight vectors that are optimized for the frequency response across the block of subcarriers. Thus, depending on the level of frequency response tracking, the two transmit weight vectors can be computed based on and applied to the whole signal bandwidth (corresponds to no frequency response tracking), or just one cluster at a time (corresponds to per-cluster tracking, e.g., Cluster EBF), or one subcarrier at a time (called MRT-type and corresponds to per-subcarrier tracking, e.g., MRT). For the EBF technique, the two weight vectors are applied across the bandwidth. For the Cluster EBF technique, a different pair of weight vectors is computed for each cluster of interest. For the MRT-type technique, a different pair of weight vectors is computed for each subcarrier.

As a variation, the ULCS may be transmitted on a decimated subset of the subcarriers rather than all subcarriers, where a decimation factor of D is defined to mean every D'th subcarrier is occupied. A high decimation factor often implies that the subcarriers occupied by the ULCS are separated by a frequency distance greater than the coherence bandwidth of the channel. If the decimation is low enough, then the subcarriers occupied by the ULCS are separated by a frequency distance that is often less than the coherence bandwidth of the channel. The UL channel $H_{UL}(k)$ can therefore be estimated for each subcarrier k (e.g., via channel estimation techniques known in the art) and may be used to compute the spatial covariance matrix R, rather than using the signal vector y(k) (e.g., $Y_{DL}^H(k)$) as above in Eq (1), as defined in equation Eq (2)

$$R = \frac{1}{K}\sum_{k=1}^{K} H_{DL}^H(k) H_{DL}(k) \qquad \text{Eq (2)}$$

where the superscript H is the conjugate transpose operator; and K may vary as a function of the desired level of frequency response tracking for the single-stream closed-loop technique (e.g. Max-ratio Transmission (MRT), Statistical Eigen-beamforming (EBF), and EBF over Clusters) and may be set for each subcarrier, over a set of subcarriers corresponding to a particular subchannel/Cluster of interest or over the whole bandwidth, as will be described in more detail later.

Returning again to FIG. 10, at block 1008, the two "largest" eigenvectors of the spatial covariance matrix R are selected as the first weight vector pair. The first weight vector pair will be transformed into a second weight vector pair (as described in FIG. 9) that is generally assumed to be constant over the range of subcarriers used to compute the spatial covariance matrix R.

FIG. 11 is a WiMAX OFMDA system 1100 having a base station 1102 with a sub-array transmit mixing mode. The BS 1102 of the system 1100 includes a plurality of OFDM blocks 1108, 1110, 1112 and 1114 having an output coupled to a transmit antenna 1118, 1120, 1122, and 1124, respectively. Each of the OFDM blocks 1108, 1110, 1112 and 1114 takes the Inverse Fast Fourier Transform (IFFT) and appends or adds a cyclic prefix (CP). In the sub-array transmit mixing mode, the two transmit streams on lines $1104_1$ and $1104_2$ each employ a weight denoted by TX weight blocks $1106_1$ and $1106_2$. However, the stream $1104_1$ with the weight denoted by TX weight blocks $1106_1$ is supplied to a first subset (sub-array) of the antennas 1118 and 1120 via OFDM blocks 1108 and 1110, respectively. The stream $1104_2$ with the weight denoted by TX weight blocks $1106_2$ is supplied to a second subset (sub-array) of the antennas 1122 and 1124 via OFDM blocks 1112 and 1114, respectively. In the sub-array transmit mixing mode, each beam or stream uses a different selection or subset of the antennas.

The mobile station (MS) 1130 includes a first antenna 1132 and a second antenna 1134. The MS 1130 sends a ULCS signal from antenna 1132 that is received by the BS 1102. The BS 1102 includes an Uplink Channel Estimator (UCE) 1170, as will be described in more detail later.

Figure 12:
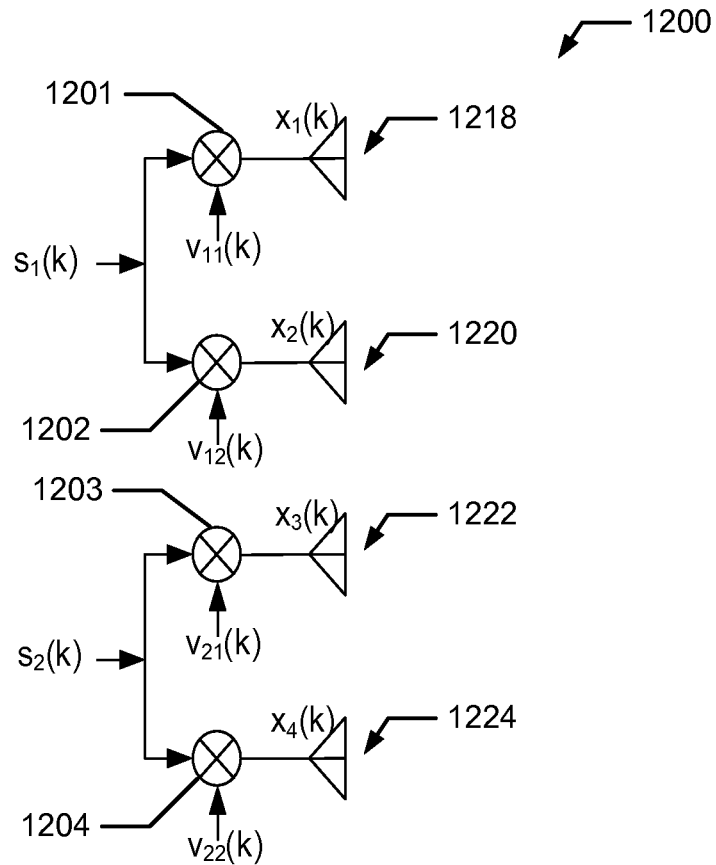
FIG. 12 is a schematic diagram for applying weights to the sub-array transmit mixing mode of FIG. 11.

FIG. 12 is a schematic diagram 1200 for applying weights to the sub-array transmit mixing mode as in FIG. 11. In the sub-array transmit mixing mode, the two transmit streams denoted as $s_1(k)$ and $s_2(k)$ are each multiplied by a plurality of weights for each of the antenna path of the respective sub-array. Thus, transmit stream $s_1(k)$ is multiplied by weights $v_{11}(k)$ and $v_{12}(k)$ via multiplier 1201 in a first antenna path to antenna 1218 and multiplier 1202 in a second antenna path to antenna 1220 of a first sub-array where k is the subcarrier, and the index i of $v_{ij}(k)$ denotes the stream 1 or 2 and the index j of $v_{ij}(k)$ denotes the antenna j=1 or 2 of the sub-array. Antennas 1218 and 1220 are a first sub-array for transmitting the first stream transmission from base station 1102.

The transmit stream $s_2(k)$ is multiplied by weights $v_{21}(k)$ and $v_{22}(k)$ via multiplier 1203 in a first antenna path to antenna 1222 and multiplier 1204 in a second antenna path to antenna 1224 of a second sub-array where k is the subcarrier, and the index i of $v_{ij}(k)$ denotes the stream 1 or 2 and the index j of $v_{ij}(k)$ denotes the antenna j=1 or 2 of the sub-array. Antennas 1222 and 1224 are a second sub-array for transmitting the second stream transmission from base station 1102. The full array transmit mixing modes are found to be superior to the sub-array transmit mixing mode in moderate-to poor-spatial conditioning, but inferior when the spatial conditioning is good.

Figure 13:
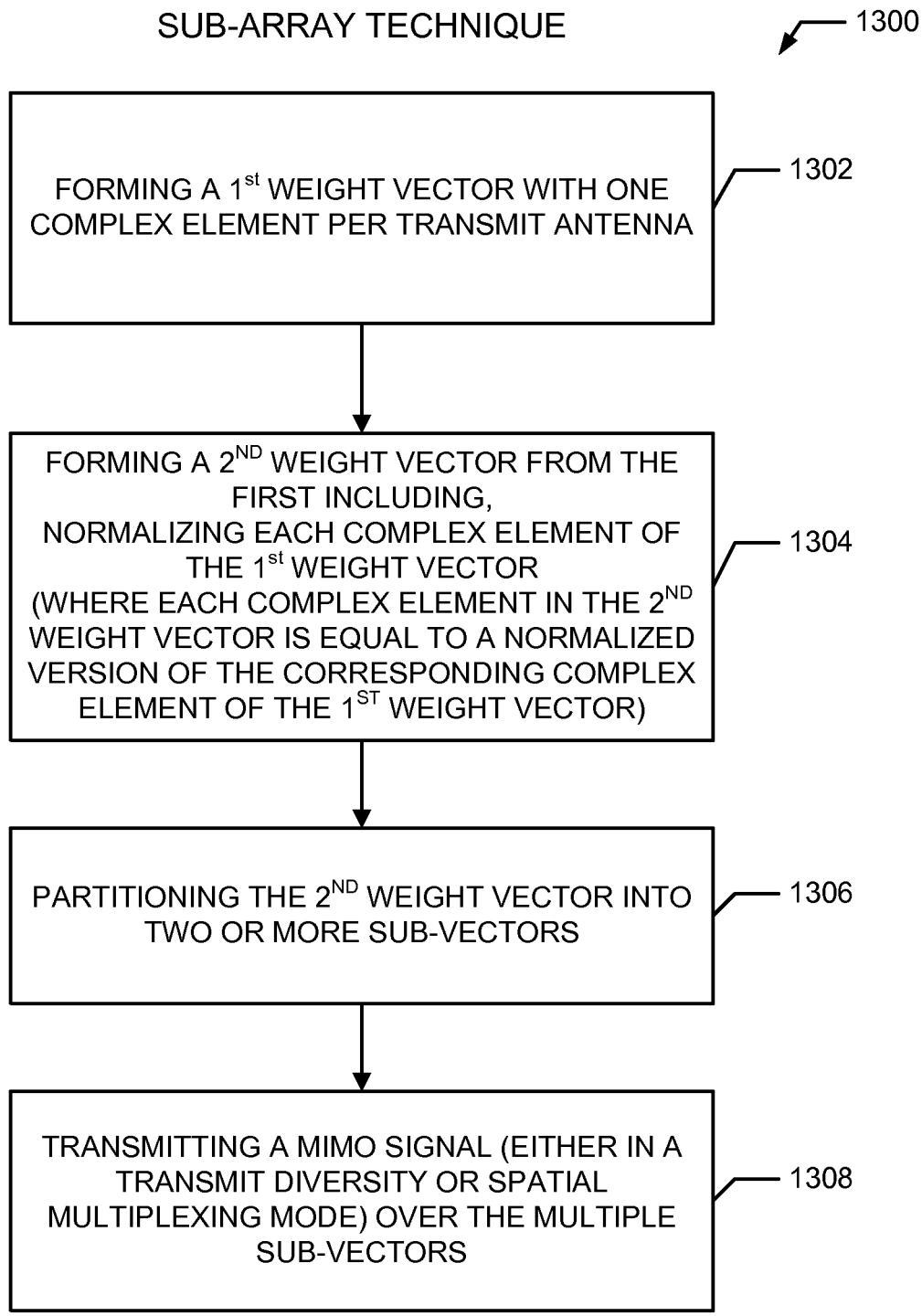
FIG. 13 is a flowchart of a process to combine MIMO and beamforming in the sub-array transmit mixing mode for implementing one or more embodiments of the invention.

FIG. 13 is a flowchart of a process 1300 to combine MIMO and beamforming in the sub-array transmit mixing mode employed in FIG. 11. The process 1300 begins with block 1302 where a first weight vector is formed. The first weight vector has one complex element per transmit antenna. At block 1304, a second weight vector is formed from the first weight vector using normalization. Normalization may include a unit-modulus of the original weight.

In the second weight vector, the complex elements for a given transmit antenna is a normalized version of the complex elements for that transmit antenna of the first weight vector. At block 1306, the second weight vector is partitioned into two or more sub-vectors. At block 1308, the MIMO signal is transmitted over the multiple sub-vectors. The MIMO signal may be transmitted either in a transmit diversity or in a SM mode.

Figure 14:
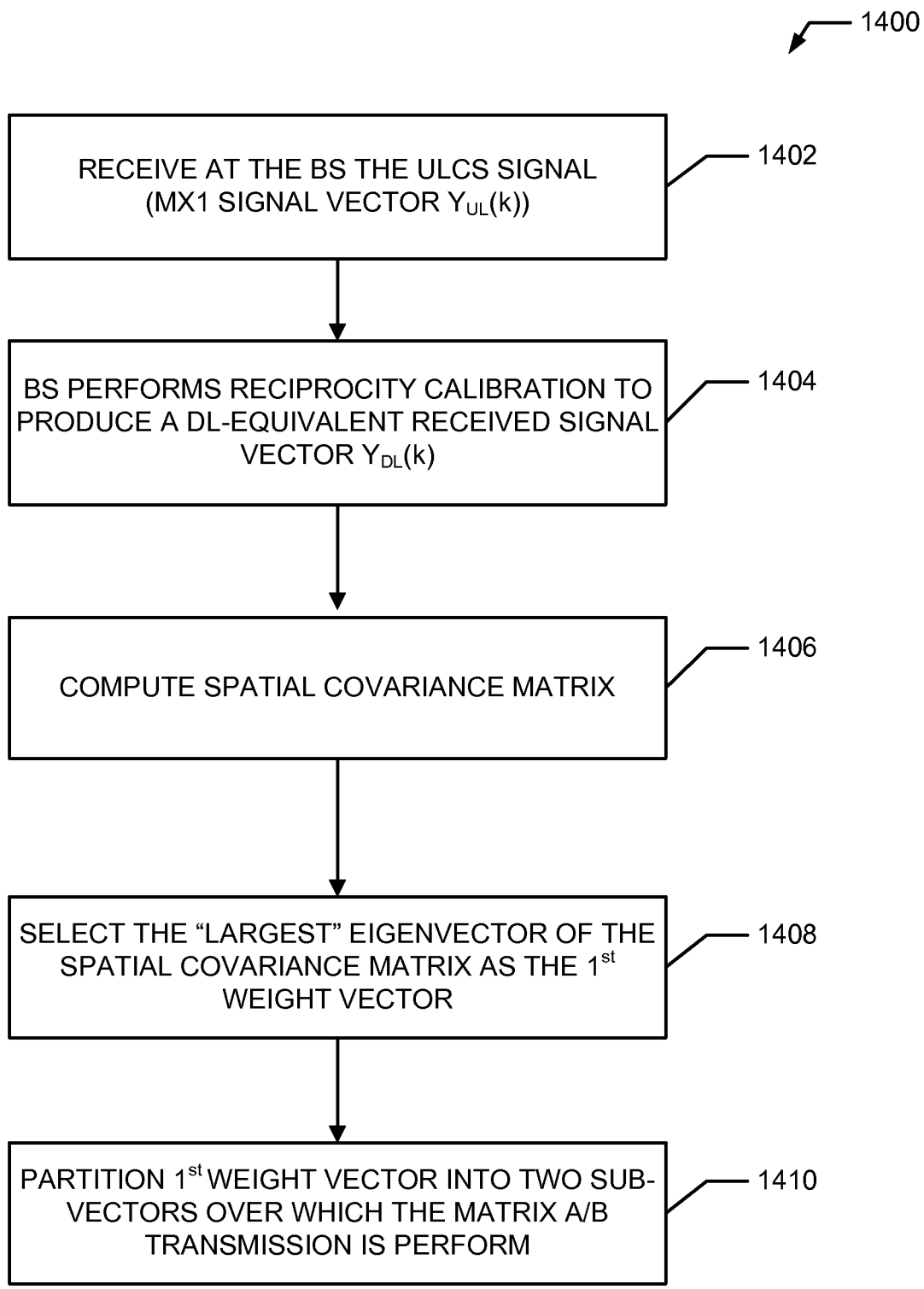
FIG. 14 is a flowchart of a process to compute a first weight vector in the sub-array transmit mixing mode of FIG. 13.

FIG. 14 is a flowchart of a process 1400 to compute a first weight vector at block 1302 of FIG. 13. The process 1400 begins, at block 1402 where the BS (e.g. BS 1102) receives a M-by-1 signal vector $y_{UL}(k)$ on subcarrier k. At block 1404, the BS (e.g. BS 1102) performs reciprocity calibrations by multiplying $y_{UL}(k)$ by a calibration coefficient vector (element-by-element) to produce a DL-equivalent received signal vector $y_{DL}(k)$. At block 1406, the spatial covariance matrix is computed from the DL-equivalent received signal vector. At block 1408, the first weight vector is selected as the largest eigenvector of the spatial covariance matrix. At block 1410, the first weight vector is then partitioned into two sub-vectors over which the matrix A/B transmission may be performed. The process 1400 performs array partitioning after the first weight vector calculation. An alternate process for calculating the first weight vector will now be described.

Figure 15:
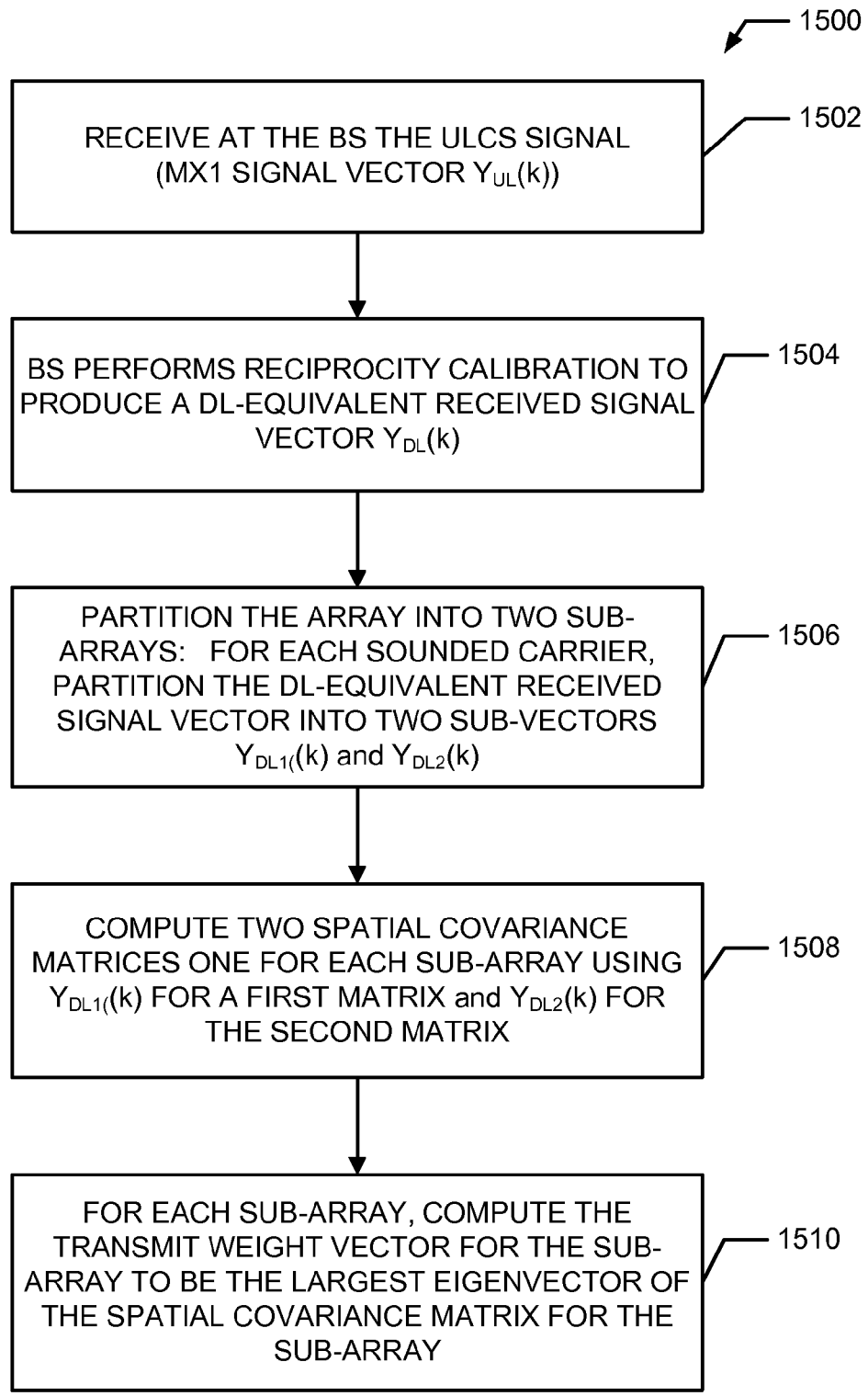
FIG. 15 is a flowchart of an alternate process to compute a first weight vector in the sub-array transmit mixing mode of FIG. 13.

FIG. 15 is a flowchart of an alternate process 1500 to compute a first weight vector at block 1302 of FIG. 13. The process 1500 begins at block 1502 where the BS (e.g. BS 1102) receives a M-by-1 signal vector $y_{UL}(k)$ on subcarrier k. At block 1504, the BS (e.g. BS 1102) performs reciprocity calibration by multiplying $y_{UL}(k)$ by a calibration coefficient vector (element-by-element) to produce a DL-equivalent received signal vector $y_{DL}(k)$. At block 1506, the antenna array is partitioned into two sub-arrays where for each sounded subcarrier, the DL-equivalent received signal vector $y_{DL}(k)$ is partitioned into two sub-vectors $y_{DL1}(k)$ and $y_{DL2}(k)$. At block 1508, two spatial covariance matrices are computed from the DL-equivalent received signal vector, one using $y_{DL1}(k)$ and the other using $y_{DL2}(k)$. At block 1510, for each sub-array, the transmit weight vector for a selected one sub-array is the largest eigenvector of the spatial covariance matrix for a respective sub-array.

In one configuration, when the decimation is low enough, the DL channel $H_{DL}(k)$ may be estimated and used to compute the spatial covariance matrix. The frequency domain of the DL channel with decimation will be described below. In equation form, the frequency domain received signal, denoted by r(k), at the mobile on the kth subcarrier is the matrix product of the channel and transmit weight matrices according to equations Eq (3)

$$r(k) = \begin{bmatrix} r_1(k) \\ r_2(k) \end{bmatrix} = H(k)W(k)s(k) + n(k) \qquad \text{Eq (3)}$$

where the different vector and matrix quantities are defined in equations Eq (4a)-Eq (4e)

$$r(k) = \begin{bmatrix} r_1(k) \\ r_2(k) \end{bmatrix}, \qquad \text{Eq (4a)}$$

$$H(k) = \begin{bmatrix} H_{11}(k) & H_{12}(k) & H_{13}(k) & H_{14}(k) \\ H_{21}(k) & H_{22}(k) & H_{23}(k) & H_{24}(k) \end{bmatrix}, \qquad \text{Eq (4b)}$$

$$W(k) = \begin{bmatrix} W_{11}(k) & W_{12}(k) \\ W_{21}(k) & W_{22}(k) \\ W_{31}(k) & W_{32}(k) \\ W_{41}(k) & W_{42}(k) \end{bmatrix}, \qquad \text{Eq (4c)}$$

$$s(k) = \begin{bmatrix} s_1(k) \\ s_2(k) \end{bmatrix}, \text{ and} \qquad \text{Eq (4d)}$$

$$n(k) = \begin{bmatrix} n_1(k) \\ n_2(k) \end{bmatrix} \qquad \text{Eq (4e)}$$

where s(k) is the transmitting signal on subcarrier k; n(k) is the noise signal on subcarrier k; W(k) is the transmit weight vector on subcarrier k; and H(k) is the channel matrix on subcarrier k; and $H_{ij}(k)$ is a DL channel; index i denotes the receive antenna 1 or 2; index j denotes the transmit antenna j=1, 2, 3 or 4. The transmit signal s(k) is either a 1- or 2-element vector, depending on the number of transmit streams. The variation of theses quantities in the time dimension is omitted from this description to simplify the equations. The different transmit signal s(k) configurations may include MRT, EBF, Cluster EBF (and variants) and one and two antenna open-loop, all of which are supported with some modifications.

As described above, the particular transmit modes may be broken into sub-array or full array transmit mixing modes. The sub-array transmit mixing mode includes a single-stream transmission sub-mode and a dual-stream transmission sub-mode. Thus, the sub-array transmit mixing mode can be employed for both single input, multiple output (SIMO) and STC/MIMO. The full array transmit mixing mode should be employed in the case of dual-stream transmission (STC/MIMO).

In the single input, single output (SISO) mode there is only one (single) transmit stream transmitted from a first antenna. In the SIMO mode, the single-weight, single-stream transmit modes include MRT, ebfData, ebfChannel and clusterEbf, and these are described in more detail below. The MRT mode has an equal gain version where the transmit weight is unit-modulus with a phase that is the negative of the channel's phase. The MRT weights track the channel over a frequency subcarrier. A cyclic delay is also imposed on the weights to center the composite channel impulse response in the cyclic prefix window (which has been found to improve downlink channel estimation performance).

In the efbData mode, one set of transmit weights are applied over a frequency bandwidth. The weights are chosen as the singular vector corresponding to the largest singular value of the spatial covariance matrix computed as the sum of outer-products of the channel estimate on the ULCSs. The "equal gain" version sets the amplitude of each transmit weight to unity (where the phase is the same as that of the singular vector). The term "data" is used since the spatial covariance matrix estimate R of Equation Eq (2) may be obtained from the received data directly rather than from a channel estimate, without the need for demodulating the sounding sequence.

The ebfChannel case is similar to the ebfData case but the sum of outer-products for the covariance matrix computation is over a per-subcarrier channel estimate. The clusterEbf case is similar to the ebfChannel case except that a sum of outer-products matrix is computed over each "cluster" (e.g. a group of 14 adjacent subcarriers). The transmit weights vary from cluster to cluster and are held fixed over each cluster with the unit-modulus corresponding to the maximum singular vector of a corresponding sum of outer-products matrix.

In the MIMO sub-array transmit mixing modes, the single-weight, "sub-array" based dual-stream transmit modes are the same as the closed-loop techniques for a single-stream (MRT, ebfData, ebfChannel, clusterEbf), but the transmit weights are split amongst pairs of antennas (i.e. the first two transmit weights weight the first stream on antennas one and two, the next two transmit weights weight the second stream on antennas three and four).

In the MIMO full array transmit mixing mode, the two-weight, dual-stream transmit modes are dualEbfData*, dualEbfDataEq**, dualEbfChannel*, dualEbfChannelEq**, dualClusterEbf*, dualClusterEbfEq. The "non-Eq" modes are distinguished with "" (double asterisk and "Eq" modes are distinguished with "*" (a single asterisk). In each of these cases, two vectors of transmit weights are derived for each sum of the outer-products matrix. The computation of the spatial covariance matrices and the bands over which the resulting weights are applied is the same as the single transmit weight versions of ebfData, ebfChannel, and clusterEbf. In all the dual cases (both "Eq" and "non-Eq" modes) the first two singular vectors of the space matrix are used to derive the transmit weights. In the Eq mode, the transmit weights are defined as the unit-modulus multiplied by 1/sqrt(2) to preserve the amount of power sent to a given antenna and equally distribute the power between the streams on each antenna. In the non-Eq mode, the weights at a given antenna are normalized so that the relative magnitudes of the weights are preserved, but the transmit power is the same from all antennas. The terms SISO, SIMO, and MIMO refer to the number of transmit streams to number of transmit antennas. The channel may be a 4×2 MIMO channel.

All of the closed-loop weights are based on the channel estimate to the first mobile antenna. The channel estimate is derived from the received ULCS waveform. Assuming that the antenna array is calibrated for reciprocity, transforming the received ULCS into a downlink channel (DL) estimate per antenna and subcarrier k is defined in equation Eq (5)

$$\hat{H}(k)=[\hat{H}_{11}(k)\hat{H}_{12}(k)\hat{H}_{13}(k)\hat{H}_{14}(k)] \quad \text{Eq (5)}$$

where $\hat{H}(k)$ corresponds to a transformed channel matrix; and $\hat{H}_{1x}$ corresponds to a transformed downlink (DL) equivalent of the received ULCS signal for antenna x where x is 1-4.

The EBF techniques (ebfData, ebfChannel, clusterEbf, single and dual stream modes) derive their weights from a spatial covariance matrix ("space" matrix). The spatial covariance matrix is estimated by a sum of outer-products of the channel estimate vectors across a predefined subcarrier set. There are two kinds of subcarrier sets. The subcarrier sets include a sounding set and cluster set, each of which is defined below.

For a WiMAX system with decimation sounding having a decimation D and offset "Doffset", the sounding set is defined in equation Eq (6)

$$K_{sounding}=\{N_{left,sounding}+lD+D_{offset}|l=0,\ldots,N_s-1\}-\{k_{DC}\} \quad \text{Eq (6)}$$

where l is an integer taking on values from 0 to Ns−1; $N_{left,sounding}$ is the number of unused subcarriers on the left of the frequency band (e.g. $N_{left,sounding}$=80 for WiMAX 1024-pt/10 MHz mode); $N_s$ is the number of sounded subcarriers, lD represents the product of l and D; and $k_{DC}$ is the index of the DC subcarrier ($k_{DC}$=512 in 1024-pt WiMAX).

Cluster sets are narrow bands with some number of adjacent subcarriers. For a WiMAX system, there are Nc cluster sets of size 14 where the cth set is defined in equation Eq (7)

$$K_C = \begin{cases} \{N_{left,PUSC}+14c+l, & l=0,\ldots,13\} & 0 \le c < N_C/2 \\ \{N_{left,PUSC}+14c+l+1, & l=0,\ldots,13\} & N_C/2 \le c < N_C \end{cases} \quad \text{Eq (7)}$$

where $N_{left,PUSC}$ is the number of unused subcarriers on the left of the PUSC frequency band (e.g. $N_{left,PUSC}$=92 for a WiMAX system using a 1024-pt mode); $N_c$=60 for 1024-pt mode.

The spatial covariance matrices are estimated based on "data" subcarriers, "clusters" or the entire bandwidth ("channel") as defined in equations Eq (8a), Eq (8b) and Eq (8c)

$$R_{data} = \sum_{k \in K_{sounding}} \hat{H}_l(k)^H \hat{H}_l(k) \quad \text{Eq (8a)}$$

$$R_{cluster}(c) = \sum_{k \in K_C} \hat{H}_l(k)^H \hat{H}_l(k), 0 \le c < N_C; \text{ and} \quad \text{Eq (8b)}$$

$$R_{channel} = \sum_{c=0}^{N_C-1} R_{cluster}(c) \quad \text{Eq (8c)}$$

where the superscript H is the conjugate transpose operator; c is for the c'th set; $R_{data}$ is the spatial covariance matrix ("space matrix") for data subcarriers; $R_{cluster}(c)$ is the spatial covariance matrix for clusters; and $R_{channel}$ is the spatial matrix for the entire channel bandwidth. The left singular vectors of the different spatial covariance matrices are denoted as $U_{data}$, $U_{cluster}(c)$ and $U_{channel}$.

The singular value decomposition (SVD) of a space matrix "R" is defined in equation Eq (9)

$$R=U\Sigma V^H \quad \text{Eq (9)}$$

where $\Sigma$ is a matrix with non-negative numbers on the diagonal and zeros off the diagonal; $V^H$ denotes the conjugate transpose of V, an unitary matrix; and with left singular vectors U defined in equation Eq (10)

$$U = \begin{bmatrix} u_{11} & u_{12} & u_{13} & u_{14} \\ u_{21} & u_{22} & u_{23} & u_{24} \\ u_{31} & u_{32} & u_{33} & u_{34} \\ u_{41} & u_{42} & u_{43} & u_{44} \end{bmatrix}. \quad \text{Eq (10)}$$

where $u_{ij}$ are _complex matrix elements of the left singular vectors; and i and j represent indices for the matrix elements.

The specific weights in each of the SIMO and sub-array MIMO case for the MRT modes are defined in equations Eq (11a) and Eq (11b), respectively, $$W_{mrt}(k) = \exp\left(\frac{-j2\pi\tau}{Nfft}\right) \begin{bmatrix} \hat{H}_{11}^*(k)/|\hat{H}_{11}(k)| \\ \hat{H}_{12}^*(k)/|\hat{H}_{12}(k)| \\ \hat{H}_{13}^*(k)/|\hat{H}_{13}(k)| \\ \hat{H}_{14}^*(k)/|\hat{H}_{14}(k)| \end{bmatrix} \quad \text{Eq (11a)}$$

$$W_{mrt}(k) = \exp\left(\frac{-j2\pi\tau}{Nfft}\right) \begin{bmatrix} \hat{H}_{11}^*(k)/|\hat{H}_{11}(k)| & 0 \\ \hat{H}_{12}^*(k)/|\hat{H}_{12}(k)| & 0 \\ 0 & \hat{H}_{13}^*(k)/|\hat{H}_{13}(k)| \\ 0 & \hat{H}_{14}^*(k)/|\hat{H}_{14}(k)| \end{bmatrix} \quad \text{Eq (11b)}$$

where * denotes a conjugate operator; Nfft is the number N of subcarriers of the Fast Fourier Transform (FFT) (e.g. Nfft=1024 subcarriers for 10 MHz WiMAX); and τ is the transmit delay in samples. For example, τ may be equal to CP/2=64 where CP refers to the cyclic prefix.

The specific weights in each of the SIMO and sub-array MIMO case for ebfData are defined in equations Eq (12a), Eq (12b) and Eq (12c)

$$W_{EbfData}(k) = W_{single}(U_{data}) \text{ where} \quad \text{Eq (12a)}$$

$$W_{single}(U) = \begin{bmatrix} u_{11}/|u_{11}| \\ u_{21}/|u_{21}| \\ u_{31}/|u_{31}| \\ u_{41}/|u_{41}| \end{bmatrix}, \text{ and} \qquad \text{Eq (12b)}$$

$$W_{single}(U) = \begin{bmatrix} u_{11}/|u_{11}| & 0 \\ u_{21}/|u_{21}| & 0 \\ 0 & u_{31}/|u_{31}| \\ 0 & u_{41}/|u_{41}| \end{bmatrix}. \qquad \text{Eq (12c)}$$

where $U_{data}$ is a left singular vector of the spatial covariance matrix.

The specific weight for ebfChannel is defined in equation Eq (13)

$$W_{EbfChannel}(k) = W_{single}(U_{Channel}) \qquad \text{Eq (13)}$$

where $U_{Channel}$ is a left singular vector of the spatial covariance matrix.

The specific weight for ClusterEbf is defined in equation Eq (14)

$$W_{ClusterEbf}(k) = W_{single}(U_{Cluster}(c_k)) \qquad \text{Eq (14)}$$

where $c_k = c \in \{0, 1, \ldots, N_c - 1\}$ such that $k \in K_c$; and $U_{Cluster}$ is a left singular vector of the spatial covariance matrix.

The specific weights for the full-array MIMO weights are defined below. The specific weight $W_{dualEbfData*}$ for dual EbfData* is defined in equations Eq (17a) and Eq (17b)

$$W_{dualEbfData}*(k) = W_{dual}(U_{data}) \text{ where} \qquad \text{Eq (17a)}$$

$$W_{dual}(U) = \begin{bmatrix} u_{11}/\sqrt{|u_{11}|^2+|u_{12}|^2} & u_{12}/\sqrt{|u_{11}|^2+|u_{12}|^2} \\ u_{21}/\sqrt{|u_{21}|^2+|u_{22}|^2} & u_{22}/\sqrt{|u_{21}|^2+|u_{22}|^2} \\ u_{31}/\sqrt{|u_{31}|^2+|u_{32}|^2} & u_{32}/\sqrt{|u_{31}|^2+|u_{32}|^2} \\ u_{41}/\sqrt{|u_{41}|^2+|u_{42}|^2} & u_{42}/\sqrt{|u_{41}|^2+|u_{42}|^2} \end{bmatrix}. \qquad \text{Eq (17b)}$$

The specific full array weight $W_{dualEbfDataEq}$ for dualEbfDataEq is defined in equations Eq (18a) and Eq (18b)

$$W_{dualEbfDataEq}**(k) = W_{dualEq}(U_{data}) \text{ where} \qquad \text{Eq (18a)}$$

$$W_{dualEq}(U) = \frac{1}{\sqrt{2}} \begin{bmatrix} u_{11}/|u_{11}| & u_{12}/|u_{12}| \\ u_{21}/|u_{21}| & u_{22}/|u_{22}| \\ u_{31}/|u_{31}| & u_{32}/|u_{32}| \\ u_{41}/|u_{41}| & u_{42}/|u_{42}| \end{bmatrix}. \qquad \text{Eq (18b)}$$

The specific full array weights $W_{dualEbfChannel*}$ and $W_{dualEbfChannelEq**}$ for dualEfbChannel* and dual EbfChannelEq**, respectively, are defined in equations Eq (19) and Eq (20), respectively, $$W_{dualEbfChannel}*(k) = W_{dual}(U_{Channel}); \text{ and} \qquad \text{Eq (19)}$$

$$W_{dualEbfChannelEq}**(k) = W_{dualEq}(U_{Channel}). \qquad \text{Eq (20)}$$

The specific weight full array weight $W_{dualClusterEbf*}$ and $W_{dualClusterEbfEq**}$ for dualClusterEfb* and dualClusterEfb** are defined in equations Eq (21) and Eq (22), respectively, $$W_{dualClusterEbf}*(k) = W_{dual}(U_{Cluster}(c_k)); \text{ and} \qquad \text{Eq (21)}$$

$$W_{dualClusterEbfEq}**(k) = W_{dualEq}(U_{Cluster}(c_k)). \qquad \text{Eq (22)}$$

There may be three transmit modes, the first is a "single-stream" mode, the other two are "dual-stream" modes. The two "dual-stream" transmit modes may include an STC mode. In the STC mode, the transmitter employs a "Matrix-A" STC (space-time coding) mode. The receiver may perform a zero-forcing followed by a MRC (maximal ratio combining) algorithm, although other receiver techniques are possible.

In an MIMO mode, the transmitter employs a "Matrix-B" Spatial Multiplexing (SM) mode. "Vertical" coding is used across streams, as per the 802.16e specification (e.g. a single code word is split between multiple transmit streams). The receiver may perform maximum likelihood (ML) detection, but MMSE (minimum mean-squared error) symbol estimation is another option.

The downlink channel estimation at the mobile station can be realized with a practical channel estimator as is known in the art. In the case of STC and MMSE, the log-likelihood ratios (LLRs) may be computed according to the max-log-map approximation. An ML receiver may compute the LLRs directly. The CTC employs some number of iterations and max-log-map floating point turbo decoding.

In the Uplink Channel Estimators (UCE) 170, 770 or 1170, the simplest UCE is "linear interpolation" in which the channel on a given subcarrier is chosen as the point (pt) on a line segment connecting the two nearest in frequency received noisy channel estimates on the sounded subcarriers. The MMSE-type UCE may interpolate the channel by linearly combining the received symbols on all the sounded subcarriers with a set of coefficients designed according to an MMSE (minimum-mean squared error) criterion. The MMSE-type UCE may uses a design profile that is uniform at baseband samples 0 through the cyclic prefix length and zero elsewhere, and a target signal-to-noise ratio (SNR) of 20 dB. Another type of UCE is a "Bayesian" channel sounding estimator that uses a time-domain channel impulse response weighting that depends on an instantaneous power-delay profile estimate and the noise power.

For both the MMSE and Bayesian type UCEs, the received signal may be cyclically delayed to the right by 8 baseband samples prior to channel estimation, in order to prevent the precursor/onset of the aliased channel being included at the tail end (due to the decimation of 8 in the ULCS and the window of size Nfft/8 for the MMSE). The 8 sample delay is removed after channel estimation. The performance of these techniques is highly dependent on the uplink channel estimation, which is highly dependent on the decimation factor, channel profile, and estimation technique.

Thus, the systems above provides for MIMO+BF in WiMAX.

In the flowcharts above, one or more of the methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional base station with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method comprising:
receiving an uplink channel sounding (ULCS) signal comprising ULCS subcarriers;
determining, at a base station, one or more of an uplink channel estimation and a covariance matrix based on the uplink channel sounding (ULCS) signal;
forming, at the base station, a first weight vector with one complex element per transmit antenna based on the one or more of the uplink channel estimation and the covariance matrix, wherein the forming the first weight vector comprises:
producing a downlink (DL) equivalent received signal from the ULCS signal and a set of reciprocity calibration coefficients,
partitioning an antenna array into two sub-arrays wherein for each ULCS subcarrier, the DL equivalent received signal is partitioned into two sub-vectors;
computing a spatial covariance matrix for each sub-array using the two sub-vectors; and
selecting a largest eigenvector in the spatial covariance matrix for said each sub-array as the first weight vector;
forming, at the base station, a second weight vector from the first weight vector, where each complex element of the second weight vector is equal to a normalized version of a corresponding complex element of the first weight vector; and
transmitting a multiple input, multiple output (MIMO) signal using the second weight vector,
wherein the second weight vector is partitioned into two or more sub-vectors prior to the transmitting and further, wherein the transmitting includes transmitting the MIMO signal over the two or more sub-vectors.

2. The method according to claim 1, further comprising: normalizing the corresponding complex element of the first weight vector using one of a 2-norm normalization function and 1/sqrt(2) times a unit-modulus of the first weight vector.

3. A wireless communication system comprising:
a mobile station transmitting an uplink channel sounding (ULCS) signal comprising ULCS subcarriers; and
a base station operable to receive the ULCS signal, determine one or more of an uplink channel estimation and a covariance matrix based on the uplink channel sounding (ULCS) signal, form a first weight vector with one complex element per transmit antenna based on the one or more of the uplink channel estimation and the covariance matrix, form a second weight vector from the first weight vector, where each complex element of the second weight vector is equal to a normalized version of a corresponding complex element of the first weight vector, and transmit a multiple input, multiple output (MIMO) signal using the second weight vector,
wherein the base station is further operable to, prior to the transmitting, partition the second weight vector into two or more sub-vectors and, when transmitting, to transmit the MIMO signal over the two or more sub-vectors, and further,
wherein when forming the first weight vector, the base station is operable to perform reciprocity calibration to produce a downlink (DL) equivalent received signal from the ULCS signal, partition an antenna array into two sub-arrays where for each ULCS subcarrier, the DL equivalent received signal is partitioned into two sub-vectors; compute a spatial covariance matrix for each sub-array; and select a largest eigenvector in the spatial covariance matrix for each sub-array as the first weight vector.

4. The system according to claim 3, where in base station is further operable to normalize the corresponding complex element of the first weight vector using one of a 2-norm normalization function and 1/sqrt(2) times a unit-modulus of the first weight vector.

5. A method comprising:
receiving an uplink channel sounding (ULCS) signal;
determining, at a base station, one or more of an uplink channel estimation and a covariance matrix based on the uplink channel sounding (ULCS) signal;

forming, at the base station, a first weight vector with one complex element per transmit antenna based on the one or more of the uplink channel estimation and the covariance matrix, wherein the forming the first weight vector comprises computing a first weight vector pair, wherein the forming the first weight vector pair comprises performing reciprocity calibration to produce the downlink equivalent received signal from the ULCS signal, wherein the computing of the first weight vector pair comprises selecting two largest eigenvectors of the spatial covariance matrix as the first weight vector pair, wherein the spatial covariance matrix is calculated according to a processing of at least one subcarrier of the ULCS signal, and further, wherein the first weight vector ($W_{mrt}(k)$) is computed based on a channel on a subcarrier according to $$W_{mrt}(k) = \exp\left(\frac{-j2\pi\tau}{Nfft}\right) \begin{bmatrix} \hat{H}_{11}^{*}(k)/|\hat{H}_{11}(k)| & 0 \\ \hat{H}_{12}^{*}(k)/|\hat{H}_{12}(k)| & 0 \\ 0 & \hat{H}_{13}^{*}(k)/|\hat{H}_{13}(k)| \\ 0 & \hat{H}_{14}^{*}(k)/|\hat{H}_{14}(k)| \end{bmatrix}$$

where * denotes a conjugate operator; k is a subcarrier; Nfft is a number N of subcarriers of a Fast Fourier Transform (FFT); $\tau$ is the transmit delay in samples; and $\hat{H}_{1X}$ corresponds to a transformed downlink (DL) equivalent of the received ULCS signal for antenna x where x is 1, 2, 3 or 4;
forming, at the base station, a second weight vector from the first weight vector, where each complex element of the second weight vector is equal to a normalized version of a corresponding complex element of the first weight vector; and
transmitting a multiple input, multiple output (MIMO) signal using the second weight vector.

6. A wireless communication system comprising:
a mobile station transmitting an uplink channel sounding (ULCS) signal; and
a base station operable to receive the ULCS signal, determine one or more of an uplink channel estimation and a covariance matrix based on the uplink channel sounding (ULCS) signal, form a first weight vector with one complex element per transmit antenna based on the one or more of the uplink channel estimation and the covariance matrix, form a second weight vector from the first weight vector, where each complex element of the second weight vector is equal to a normalized version of a corresponding complex element of the first weight vector, and transmit a multiple input, multiple output (MIMO) signal using the second weight vector, wherein when forming the first weight vector, the base station is operable to compute a first weight vector pair based on a spatial covariance matrix, where two largest eigenvectors in the spatial covariance matrix are selected as the first weight vector pair, wherein the base station is further operable to produce a downlink equivalent received signal from the ULCS signal and a set of reciprocity calibration coefficients, and computing of the spatial covariance matrix based on the downlink equivalent received signal, wherein the spatial covariance matrix is calculated according to a processing of at least one sub-carrier of the ULCS signal, and further, wherein the first weight vector ($W_{mrt}(k)$) for the MRT technique is defined as $$W_{mrt}(k) = \exp\left(\frac{-j2\pi\tau}{Nfft}\right) \begin{bmatrix} \hat{H}_{11}^{*}(k)/|\hat{H}_{11}(k)| & 0 \\ \hat{H}_{12}^{*}(k)/|\hat{H}_{12}(k)| & 0 \\ 0 & \hat{H}_{13}^{*}(k)/|\hat{H}_{13}(k)| \\ 0 & \hat{H}_{14}^{*}(k)/|\hat{H}_{14}(k)| \end{bmatrix}$$

where * denotes a conjugate operator; k is a subcarrier; Nfft is a number N of subcarriers of a Fast Fourier Transform (FFT); $\tau$ is the transmit delay in samples; and $\hat{H}_{1X}$ corresponds to a transformed downlink (DL) equivalent of the received ULCS signal for antenna x where x is 1, 2, 3 or 4.

7. A method comprising:
receiving an uplink channel sounding (ULCS) signal;
determining, at a base station, one or more of an uplink channel estimation and a covariance matrix based on the uplink channel sounding (ULCS) signal;
forming, at the base station, a first weight vector with one complex element per transmit antenna based on the one or more of the uplink channel estimation and the covariance matrix, wherein the forming the first weight vector comprises computing a first weight vector pair, wherein the forming the first weight vector pair comprises performing reciprocity calibration to produce the downlink equivalent received signal from the ULCS signal, wherein the computing of the first weight vector pair comprises selecting two largest eigenvectors of the spatial covariance matrix as the first weight vector pair, wherein the spatial covariance matrix is calculated according to a processing of at least one subcarrier of the ULCS signal, and further, wherein the first weight vector ($W_{EbfData}(k)$) is computed based on the covariance matrix according to $$W_{EbfData}(k) = W_{single}(U_{data}) \text{ where}$$

$$W_{single}(U) = \begin{bmatrix} u_{11}/|u_{11}| & 0 \\ u_{21}/|u_{21}| & 0 \\ 0 & u_{31}/|u_{31}| \\ 0 & u_{41}/|u_{41}| \end{bmatrix}$$

where $u_{ij}$ are complex matrix elements of left singular vectors; i and j represent indices for the complex matrix elements; $U_{data}$ is left singular vectors of the covariance matrix; and k is a subcarrier;
forming, at the base station, a second weight vector from the first weight vector, where each complex element of the second weight vector is equal to a normalized version of a corresponding complex element of the first weight vector; and
transmitting a multiple input, multiple output (MIMO) signal using the second weight vector.

8. A wireless communication system comprising:
a mobile station transmitting an uplink channel sounding (ULCS) signal; and
a base station operable to receive the ULCS signal, determine one or more of an uplink channel estimation and a covariance matrix based on the uplink channel sounding (ULCS) signal, form a first weight vector with one complex element per transmit antenna based on the one or more of the uplink channel estimation and the covariance matrix, form a second weight vector from the first weight vector, where each complex element of the second weight vector is equal to a normalized version of a corresponding complex element of the first weight vector, and transmit a multiple input, multiple output (MIMO) signal using the second weight vector, wherein when forming the first weight vector, the base station is operable to compute a first weight vector pair based on a spatial covariance matrix, where two largest eigenvectors in the spatial covariance matrix are selected as the first weight vector pair, wherein the base station is further operable to produce a downlink equivalent received signal from the ULCS signal and a set of reciprocity calibration coefficients, and computing of the spatial covariance matrix based on the downlink equivalent received signal, wherein the spatial covariance matrix is calculated according to a processing of at least one subcarrier of the ULCS signal, and further, wherein the first weight vector ($W_{EbfData}(k)$) is computed based on the covariance matrix according to $W_{EbfData}(k)=W_{single}(U_{data})$ where $$W_{single}(U) = \begin{bmatrix} u_{11}/|u_{11}| & 0 \\ u_{21}/|u_{21}| & 0 \\ 0 & u_{31}/|u_{31}| \\ 0 & u_{41}/|u_{41}| \end{bmatrix}$$

where $u_{ij}$ are complex matrix elements of left singular vectors; i and j represent indices for the complex matrix elements; $U_{data}$ is left singular vectors of the covariance matrix; and k is a subcarrier.

* * * * *